US010259754B2

United States Patent
Merritt et al.

(10) Patent No.: US 10,259,754 B2
(45) Date of Patent: Apr. 16, 2019

(54) SOLUBLE HUMIN

(71) Applicant: AG Export International, LLC, St Augustine, FL (US)

(72) Inventors: Kevin Merritt, Jacksonville, FL (US); Mir M. Seyedbagheri, Boise, ID (US)

(73) Assignee: AG Export International, LLC, Saint Augustine, FL (US)

( * ) Notice: Subject to any disclaimer, the term of this patent is extended or adjusted under 35 U.S.C. 154(b) by 101 days.

(21) Appl. No.: 15/357,123

(22) Filed: Nov. 21, 2016

(65) Prior Publication Data

US 2018/0141875 A1  May 24, 2018

(51) Int. Cl.
  *C05C 9/00*  (2006.01)
  *C05G 3/00*  (2006.01)
  *C09K 17/14*  (2006.01)
(52) U.S. Cl.
  CPC ............... *C05C 9/00* (2013.01); *C05C 9/005* (2013.01); *C05G 3/0064* (2013.01); *C09K 17/14* (2013.01)
(58) Field of Classification Search
  CPC ......... C05C 9/00; C05C 9/005; C05G 3/0064; C09K 17/14
  See application file for complete search history.

(56) References Cited

U.S. PATENT DOCUMENTS

| | | | | |
|---|---|---|---|---|
| 4,069,034 A | * | 1/1978 | Hoover | C05B 7/00 23/300 |
| 7,067,155 B2 | * | 6/2006 | Lown | A61K 31/405 424/439 |

FOREIGN PATENT DOCUMENTS

| | | |
|---|---|---|
| JP | 2006272171 | 10/2006 |
| WO | 2010094985 A1 | 8/2010 |

OTHER PUBLICATIONS

Arihant Chemical Industries. "Ammonium Humate Powder" <http://www.arihantgroupindustries.com/ammonium-humate-powder-561320.html> Jun. 6, 2014 pp. 1-2.*
Jomhataikool, Buntita, et al. "Humic substance extraction from leonardite, lignite Mae Mho Mine by base-acid treatment process." The Journal of Applied Science vol. 16 Special issue: 26-32 [2017].*
Swanson, Vernon E., and T. G. Ging. "Possible economic value of trona-leonardite mixtures." US Geological Survey Professional Paper 800 (1972): D71-D74.*
International Search Report and Written Opinion dated Feb. 14, 2018, in PCT/US2017/060573 filed Nov. 8, 2017.
Gardinier, Andrew, et al. Urea Fertilizer. Agronomy Fact Sheet Series—Fact Sheet 80. Cornell University Cooperative Extension, College of Agriculture and Sciences, Field Crops Extension, 2013.
Kohl, S. et al. The Binding of Organic Contaminents to Humin. Available online at https://www.engg.ksu.edu/HSRC/96Proceed/kohl.pdf.
Li, Cuilan et al. Characterization of Bulk Soil Humin and Its Alkaline-Soluble and Alkaline-Insoluble Fractions. R. Bras. Ci. Solo. 2015, 39:120-126.
Lichtfouse. Eric. A novel model of humin. Analusis, EDP Sciences, 1999, 27(5), pp. 385-386.
Lichtfouse, Eric et al. Occurrence of biomarkers and straight-chain biopolymers in humin: implication for the origin of soil organic matter. Die Naturwissenschaften. 1998, 85 (10), pp. 449-452.
Nebbioso, et al. Unveiling the molecular composition of the unextractable soil organic fraction (humin) by humeomics. Biol Fertil Soils. Dec. 30, 2014. Published online Jan. 20, 2015, 9 unnumbered pages.
Pettit, Robert E. Organic Matter, Humus, Humate, Humic Acid, Fulvic Acid and Humic: Their Importance in Soil Fertility and Plant Health. 2008. Available online at http://www.humates.com/pdf/ORGANICMATTERPettit.pdf.
Rice, James A. Humin. Soil Science. 166(11), 2001, pp. 848-857.
Simpson, Andre J. et al. Unraveling the Structural Components of Soil Humin by Use of Solution-State Nuclear Magnetic Resonance Spectroscopy. Environ. Sci. Technol. 2007, 41, 876-883.
Wang, Yahui et al. Impact of Humin on Soil Adsorption and Remediation of Cd(II), Pb(II), and Cu(II). Soil and Sediment Contamination. 2016, 25(6) pp. 700-715.

* cited by examiner

*Primary Examiner* — Jennifer A Smith
(74) *Attorney, Agent, or Firm* — Hovey Williams LLP

(57) ABSTRACT

The present invention provides highly water soluble products derived from humin, as well as methods of obtaining such products. Humin is first blended with water and a nitrogen source, such as urea, under intense agitation and heating, in order to disperse the nitrogen source. Thereupon, the blend is incubated for an extended period to create nitrogen-reacted humin having the desired solubility properties. The products may be used as aqueous dispersions, or dried in the form of particulates.

16 Claims, No Drawings

SOLUBLE HUMIN

BACKGROUND OF THE INVENTION

Field of the Invention

The present invention concerns humin-containing products which are readily dispersible in water to form stable dispersions. More particularly, the invention is concerned with such products, and methods of preparing the products, wherein humin is reacted with a nitrogen source, such as urea, at elevated temperatures, and incubated over time to create the final products. These products can be used in liquid form, or dried as powders which can be reconstituted in water.

Description of the Prior Art

Humin is defined as the fraction of humic substances in soil that is insoluble in aqueous solution at any pH value. Stated otherwise, humin is the residual organic matter that remains in a humate sample after extraction of humic and fulvic acids. There are several commercially feasible methods currently in use for the extraction of humic and fulvic acids from humates. One such method involves alkaline extraction of raw Lignite, Leonardite, Humalite, sub-bituminous coal, and peat at high temperatures. After these treatments, the common practice is to discard the humin byproduct as waste, notwithstanding the beneficial carbonaceous ingredients in the humin.

Historically, humin has generated relatively little research interest as compared with other humic fractions, perhaps owing to the fact that humin is a highly insoluble, chemically intractable substance. However, humin typically represents more than 50% of the organic carbon in soil, and more than 70% of the organic carbon in unlithified sediments. This, coupled with the unique role of humic materials in the biogeochemical cycle of carbon, should make humin a prime source of beneficial materials.

Essentially all known techniques for treating humin are laboratory-scale and tedious to carry out. For example, humin products containing organic carbon and inorganic matter are treated with concentrated HF/HCL solutions to dissolve metal oxides and aluminosilicates, which results in a variety of possible modifications of the organic matter, such as hydrolysis. In another technique, humin samples are treated by a number of successive extractions using sodium hydroxide. In yet another method, humins were isolated by exhaustively extracting a sample with NaOH/urea (0.1 M/6 M). Subsequently, the extracted residue, after dialysis to remove urea, was further extracted with DMSO and 6% (v/v) $H_2SO_4$.

There is a decided need in the art for an improved, commercially viable method for dispersing or solubilizing humin in water to produce stable dispersions resistant to sedimentation of the humin. It would also be advantageous to provide dried forms of such dispersions which can be easily reconstituted in water.

SUMMARY OF THE INVENTION

The present invention overcomes the problems outlined above and provides new methods and humin products which are highly dispersible in water. Generally speaking, the method involves forming an aqueous blend including humin and a nitrogen source, such as urea, which usually involves intense mixing and heating of these components until the nitrogen source is dispersed. Thereupon, the mixture is incubated over a relatively long period of from about 8-720 hours, typically with continuous recirculation and/or mild agitation to create the final nitrogen-reacted humin having the desired water dispersibility properties.

Although not wanting to be bound by any theory of operability, it is believed that the nitrogen source reacts with the naturally occurring humin in a complex series of combinational chemistry reactions to produce a wide variety of nitrogen-reacted humin species. In any event, the final aqueous products form stable dispersions in water, that is, the dispersions resist any appreciable settling out of the nitrogen-reacted humin solids at room temperature for a period of at least about 30 days, and more preferably at least about 90 days. The liquid dispersions can be dried by conventional means, such as spray drying, to give powdered products which can be reconstituted in water.

The products of the invention can be used in a variety of contexts, including the following:
slow-release fertilizers;
salt remediation in soil and water;
complexation agent for macro/micronutrients to ensure fertilizer/water use efficiency;
erosion control media for sediment;
stabilizing media for cut slopes;
post-range fire soil treatment;
bioremediation for hydrocarbon spills and contaminated soils; and
nursery container growth media.

Most but not all of the uses of the humin products of the invention involve, in one way or another, contacting the humin products with existing soils.

DETAILED DESCRIPTION OF THE PREFERRED EMBODIMENTS

The following example sets forth one suitable method for preparing the humin products of the invention. It is to be understood, however, that this example is provided by way of illustration only, and nothing therein should be taken as a limitation upon the overall scope of the invention.

Example

This Example describes a technique in accordance with the invention for producing an aqueous humin dispersion. The humin was derived as an insoluble byproduct from the humic acid extraction of sub-bituminous coal (Leonardite). The extraction process was the standard alkaline commercial process used by Humic Growth Solutions, Inc. of St. Augustine, Fla. However, any technique for obtaining humin would be satisfactory.

In the humin dispersion process, 2,514 gallons of water was heated to 180° F. and placed in a large, thermally insulated, 8,000-gallon high intensity mixing tank. Thereupon, 6,000 lbs of granular urea was added to the tank and aggressively mixed with the heated water for a period of about 15-20 minutes until the urea was substantially liquefied and flowable. Then 8,500 pounds of humin was added to the tank with continued aggressive agitation for a period of approximately 1 hour to create an aqueous blend of urea and humin. During this step, the pH of the material decreased from about 9.5 to 9.35. The blend was then directed to a thermally insulated, recirculating blend tank equipped with a vertical agitator operated at a speed of 98 rpm and with a bottom-to-top recirculation rate of 150 gallons per minute. The blend was then incubated during operation of the blend tank for a period of 168 hours, during which a complex series of combinational chemistry interactions between humin and urea occurred, resulting in nitrogen-reacted humin. The temperature of the blend in the blend tank slowly decreased during the incubation period, at a rate of approximately 3-5° F. for each 24-hour period. At the end of the incubation period, the blend had a temperature of slightly above room temperature, and was screened through a 400-mesh screen. The liquid which passed through the screen was recovered as the final aqueous humin dispersion, whereas the inert solids not passing through the screen (primarily composed of sand and clay) were separately collected. The final humin dispersion had a pH of approximately 9.35. The final dispersion was then spray-dried to a powder in a conventional spray dryer using an inlet air temperature of 580° F., an outlet air temperature of 190° F., a pressure of 2,000 psi, and a 7-second dwell time within the dryer. The powder could be readily reconstituted in ambient temperature water by simple mixing to create a stable dispersion.

The final liquid dispersion before spray drying had a total organic matter content of 21.06% by weight with a calculated organic carbon content of 12.22% by weight and a Total Kjeldahl Nitrogen (TKN) content of 6.53% by weight, based upon the total weight of the final liquid dispersion taken as 100% by weight. A weight average molecular weight analysis of the final dispersion using gel permeation chromatography with poly(ethylene glycol) and poly(ethylene oxide) calibrations determined that the molecular weight distribution of the dispersed material ranged from 420 to 905,000 Daltons. A 1-D carbon NMR analysis revealed that the product included sucrose.

Generally speaking, final liquid dispersions in accordance with the invention (i.e., with removal of inert solids, such as sand and clay) have the following characteristics:

- pH of from about 8.0-11.5, more preferably from about 8.5-10;
- total organic material content of from about 15-30% by weight, more preferably from about 20-22% by weight, based upon the total weight of the nitrogen-reacted humin solids content of the final dispersion taken as 100% by weight;
- total organic carbon content of from about 5-20% by weight, more preferably from about 12-15% by weight, based upon the total weight of the nitrogen-reacted humin solids content of the final dispersion taken as 100% by weight;
- a TKN content of from about 2-12% by weight, more preferably from about 6-11% by weight, based upon the total weight of the nitrogen-reacted humin solids content of the final dispersion taken as 100% by weight;
- a weight average molecular weight range for the nitrogen-reacted humin solids content of the dispersion of from about 100-1,500,000 Daltons, more preferably from about 300-1,000,000 Daltons; and
- the ability of the dispersion to stay in a stable form without any appreciable settling out of nitrogen-reacted humin solids (i.e., no more than about 5% by weight of such solids) at room temperature for a period of at least about 30 days, and more preferably at least about 90 days.

Dry powder products in accordance with the invention generally have the following characteristics:

- a moisture level of from about 5-15% by weight, more preferably from about 12-14% by weight, based upon the total weight of the powder taken as 100% by weight;
- total organic material content of from about 60-80% by weight, more preferably from about 70-75% by weight, based upon the total weight of the powder taken as 100% by weight;
- total organic carbon content of from about 40-50% by weight, more preferably from about 42-47% by weight, based upon the total weight of the powder taken as 100% by weight;
- a TKN content of from about 15-25% by weight, more preferably from about 16-18% by weight, based upon the total weight of the powder taken as 100% by weight;
- dispersibility of the dry powder in plain water without the need for heating or aggressive mixing, at a level of at least about 6 ounces, preferably from about 8-32 ounces, and more preferably from about 16-20 ounces, of dry powder per gallon of water; and
- the same weight average molecular weight ranges as the liquid dispersion product.

As noted, the methods of the invention comprise the steps of forming an aqueous blend including humin and a nitrogen source, incubating said blend for a period of from about 8-720 hours, and recovering a final aqueous dispersion of nitrogen-reacted humin, preferably having some or all of the above properties and characteristics. In the starting blend, the weight ratio of humin:nitrogen should range from about 0.5-7, more preferably from about 1.5-5.

The nitrogen source is normally selected from the group consisting of urea, monoammonium phosphate, diammonium phosphate, anhydrous ammonia, aqueous ammonia, ammonium nitrate, ammonium sulfate, ammonium phosphate, sodium nitrate, calcium nitrate, potassium nitrate, nitrate of soda, urea formaldehyde, ammonium polyphosphate, and mixtures thereof. Urea is the most preferred nitrogen source.

Preferably, during the agitation incubation period, the blend should be heated to a temperature of from about 100-200° F., more preferably from about 165-195° F. Advantageously, during incubation, the heating begins at a higher temperature level and is progressively reduced over the course of the incubation period, resulting in a product having a temperature slightly above room temperature, e.g., from about 77-90° F. The temperature reduction is preferably reduced at a rate of from about 2-10° F. for each 24-hour period.

We claim:

1. An aqueous dispersion of nitrogen-reacted humin formed using the method comprising the steps of:
    forming an aqueous blend including water, water-insoluble humin, and a nitrogen source, said humin derived from a humic substance comprising humic acid, fulvic acid, and humin, by separation of humic acid and fulvic acid from the humic substance, leaving humin,
    said separated water-insoluble humin reacted with said nitrogen source,
    said blend having an initial temperature of from about 100-200° F.;
    incubating said blend for a period of from about 8-720 hours, and causing the temperature of said blend to decrease during said incubation period; and
    recovering said incubated blend as the aqueous dispersion of nitrogen-reacted humin, having a pH of from about 8.0-11.5.

2. A nitrogen-reacted humin-containing powder formed by the method comprising the steps of:

forming an aqueous blend including water, water-insoluble humin, and a nitrogen source, said humin derived from a humic substance comprising humic acid, fulvic acid, and humin, by separation of humic acid and fulvic acid from the humic substance, leaving humin, said separated water-insoluble humin reacted with said nitrogen source, said blend having an initial temperature of from about 100-200° F.;

incubating said blend for a period of from about 8-720 hours, and causing the temperature of said blend to decrease during said incubation period; and recovering said incubated blend as an aqueous dispersion of nitrogen-reacted humin which is dispersible in water and having a pH of from about 8.0-11.5; and spray-drying said aqueous dispersion of nitrogen-reacted humin to form a nitrogen-reacted humin-containing powder which is dispersible in water.

3. An aqueous nitrogen-reacted humin dispersion comprising humin dispersed in water, said humin derived from a humic substance comprising humic acid, fulvic acid, and water-insoluble humin, by separation of humic acid and fulvic acid from the humic substance, leaving water-insoluble humin, said separated water-insoluble humin having been reacted with a nitrogen source to render the nitrogen-reacted humin dispersible in water, said dispersion having a pH of from about 8.0-11.5 and characterized by the ability of the dispersion to stay in stable form without any appreciable settling out of solids at room temperature for a period of at least about 30 days.

4. The dispersion of claim 3, said water-insoluble humin consisting essentially of humin.

5. The dispersion of claim 3, said dispersion having the ability to stay in stable form without any appreciable settling out of said nitrogen-reacted humin solids at room temperature for a period of at least about 90 days.

6. The dispersion of claim 3, said dispersion having a total organic material content of from about 15-30% by weight, based upon the total weight of the nitrogen-reacted humin solids content of the final dispersion taken as 100% by weight.

7. The dispersion of claim 3, said dispersion having a total organic carbon content of from about 5-20% by weight, based upon the total weight of the nitrogen-reacted humin solids content of the final dispersion taken as 100% by weight.

8. The dispersion of claim 3, said dispersion having a Total Kjeldahl Nitrogen content of from about 2-12% by weight, based upon the total weight of the nitrogen-reacted humin solids content of the final dispersion taken as 100% by weight.

9. The dispersion of claim 3, said dispersion having a weight average molecular weight range for the nitrogen-reacted humin solids content of the dispersion of from about 100-1,500,000 Daltons.

10. An essentially dry particulate product comprising nitrogen-reacted humin, said humin derived from a humic substance comprising humic acid, fulvic acid, and water-insoluble humin, by separation of humic acid and fulvic acid from the humic substance, leaving water-insoluble humin, said particulate product being dispersible in plain water without the need for heating at a level of at least about 6 ounces of the particulate product per gallon of water.

11. The product of claim 10, said water-insoluble humin consisting essentially of humin.

12. The product of claim 10, said product having a moisture level of from about 5-15% by weight, based upon the total weight of the dry particulate product taken as 100% by weight.

13. The product of claim 10, said product having a total organic material content of from about 60-80% by weight, based upon the total weight of the dry particulate product taken as 100% by weight.

14. The product of claim 10, said product having a total organic carbon content of from about 40-50% by weight, based upon the total weight of the dry particulate product taken as 100% by weight.

15. The product of claim 10, said product having a Total Kjeldahl Nitrogen content of from about 15-25% by weight, based upon the total weight of the dry particulate product taken as 100% by weight.

16. The product of claim 10, said product having a weight average molecular weight range of from about 100-1,500,000 Daltons.

* * * * *